United States Patent
Klapishevskyy et al.

(10) Patent No.: US 12,422,154 B2
(45) Date of Patent: Sep. 23, 2025

(54) DECENTRALIZED SUPPLY AND EXHAUST UNIT WITH HEAT RECOVERY

(71) Applicant: Limited Liability Company Ventilation Systems, Kyiv (UA)

(72) Inventors: Oleksandr Klapishevskyy, Kyiv (UA); Anatoliy Tsomyk, Kyiv (UA)

(73) Assignee: Limited Liability Company Ventilation Systems, Kyiv (UA)

( * ) Notice: Subject to any disclaimer, the term of this patent is extended or adjusted under 35 U.S.C. 154(b) by 0 days.

(21) Appl. No.: 18/985,618

(22) Filed: Dec. 18, 2024

(65) Prior Publication Data

US 2025/0207795 A1 Jun. 26, 2025

(51) Int. Cl.
F24F 7/08 (2006.01)
F24F 12/00 (2006.01)

(52) U.S. Cl.
CPC ............... *F24F 7/08* (2013.01); *F24F 12/006* (2013.01); *F24F 2221/17* (2013.01)

(58) Field of Classification Search
CPC ... F24F 12/006; F28D 9/0018; F28D 21/0014
See application file for complete search history.

(56) References Cited

U.S. PATENT DOCUMENTS

2023/0175786 A1* 6/2023 Evertz ............... F28D 21/0015
165/166

FOREIGN PATENT DOCUMENTS

| EP | 2660525 A2 | 11/2013 |
|---|---|---|
| EP | 3473942 B1 | 4/2020 |
| EP | 4067773 A1 | 10/2022 |
| WO | 2008052493 A1 | 5/2008 |
| WO | 2016096965 A1 | 6/2016 |
| WO | 2019017831 A1 | 1/2019 |

OTHER PUBLICATIONS

Extended European Search Report dated Jun. 4, 2024 in EP Application No. 23219860.6-1015, 3 pages.
UV Publication dated Nov. 29, 2023 in Ukraine Application No. 202300615, With English Translation 23 pages.

* cited by examiner

Primary Examiner — Jianying C Atkisson
Assistant Examiner — Khaled Ahmed Ali Al Samiri
(74) Attorney, Agent, or Firm — Andrew M. Calderon; Calderon Safran & Wright P.C.

(57) ABSTRACT

The disclosure relates to the field of ventilation systems, specifically to ventilation systems in residential and non-residential (commercial) buildings. Specifically, the invention relates to decentralized supply and extract units with waste heat recovery and can be used for transmitting heat and power from an extraction air flow, i.e. from a flow of air extracted from a building, to a supply air flow, i.e. a flow of fresh air being drawn into a building, for the purpose of replacing spent air from the building.

16 Claims, 6 Drawing Sheets

DECENTRALIZED SUPPLY AND EXHAUST UNIT WITH HEAT RECOVERY

FIELD OF THE INVENTION

The invention relates to the field of ventilation systems, specifically to ventilation systems in residential and non-residential (commercial) buildings. Specifically, the invention relates to decentralized supply and extract units with waste heat recovery and can be used for transmitting heat and power from an extraction air flow, i.e. from a flow of air extracted from a building, to a supply air flow, i.e. a flow of fresh air being drawn into a building, for the purpose of replacing spent air from the building.

BACKGROUND

The prior art discloses a great number of different technical solutions, of varying shapes and designs, aimed at providing natural ventilation of residential and non-residential buildings. The quest to find optimal ventilation system solutions is driven by an attempt to equip a ventilated building in such a way as to provide maximum energy savings and to create a controlled environment within a building. In buildings like these, as a consequence of using central heating and operating domestic appliances, significant drying and contamination of the air inside the building occurs, which in turn creates a suitable environment for the development of allergenic diseases and breathing complications. In springtime and during the summer, energy efficient buildings are not good at removing increased levels of moisture from the air, which makes the natural circulation of air inside a building difficult, as a result creating a suitable environment for the development of fungi and harmful microorganisms.

A ventilation system is disclosed in documents EP 3 473 942 B1 and EP 4 067 773 A1. Another example for a ventilation system having two flow channels, wherein each of the flow channels has a fan, is provided in EP 2 660 525 A2, disclosing air channels not penetrating each other. This is the simplest way for constructing such a ventilation system. However, such kind of assembling air channels does not allow effective heat exchange between a flow of air extracted from a building and a supply air flow.

WO 2019/017831 A1 discloses a decentralized supply and extract unit with waste heat recovery, said unit comprising a recuperative heat exchanger with an air duct, a fan and a heat exchanger, all of which are linked to each other and can be built into the wall of a building, between the external and internal surfaces of said building, a corrugated heat exchanger, Q-shaped in cross-section, being used as the heat-exchange element, at both ends of which an external fan and an internal fan are fitted.

WO 2016/096965 A1 also discloses a heat exchanger for the purpose of heat transfer, carried out between two fluid mediums, wherein this heat exchanger is in the form of a round ring cylinder, and the heat-exchange elements are located around the axis of the cylinder, and are adjacent to each other, wherein the path along which the fluid medium travels into the counter-current flow zones and co-current flow zones in the heat exchanger, runs parallel with the axis of the cylinder, wherein the fluid mediums are set in motion by means of two fans, located at the end surfaces of the heat exchanger. The flow diagram of this heat-exchange device is shown in FIG. 1. The heat exchanger 1, in the form of a round ring cylinder, has two opposing end surfaces, each of which is divided into an external zone 46 and an internal zone 47, which are hydraulically separated from one another. A fan 52 and a fan 53 are located in the internal zones 47, the axes of which fans run parallel with the axis of the heat exchanger 1 and are located on this axis. Therefore, the fans 52 and 53, in this design, are located in annular collars 54 and 55 which run parallel with the axis 5 of the cylinder and are located on this axis. Moreover, if the temperature outside a building is significantly higher than the temperature inside that building, such geometrical positioning of at least the internal fan results in the formation of high levels of condensate which can ingress into the building. This is also true for the reverse situation, i.e. when the temperature outside the building is significantly lower than the temperature inside the building, which results in excessive dropout of condensate and can result in the formation of ice. Furthermore, dividing the end surface of the heat exchanger 1 into an external zone 46 and an internal zone 47, where flows are moving in opposite directions, results in an increase in resistance of the flow of air passing through the heat exchanger, which in turn results in increased noise levels when the heat-exchange device is operating, to increased power consumption and a higher wear rate of the fans.

SUMMARY OF INVENTION

The aim of the invention is to reduce levels of condensate formation during operation of a decentralized supply and extract unit with waste heat recovery. This aim is achieved by means of the decentralized supply and extract unit with waste heat recovery defined in claim 1. The preferred embodiments of the invention are defined in the dependent claims.

The ventilation unit is designed to be installed into an external wall of a building and has an indoor module located on the inside of the wall of the building and a heat-exchange module adjoining said indoor module. The heat-exchange module moreover comprises a cylindrical corrugated heat exchanger with a plurality of cross-sectionally similar heat-exchange air ducts, which are located along the axis of symmetry of said heat exchanger and are located adjacent to each other, forming a continuous corrugated volume of heat-exchange elements. Furthermore, the unit comprises a first separator and a second separator for separating and directing extraction and supply air flows in opposite directions in the heat-exchange air ducts, wherein the first separator and the second separator adjoin the heat exchanger at both end surfaces thereof and are installed on the axis of symmetry of said heat exchanger. Furthermore, the unit has a first fan and a second fan, the fan units of which adjoin the first separator and the second separator respectively, at the ends of the separators facing away from the heat exchanger, wherein the axis of one of the fans is located parallel with the axis of the other fan but is not aligned with the latter. As a consequence, both fans can be in opposing positions, relative to the heat exchanger, behind the separators, but not be in alignment with to each other.

According to the present invention, the first separator and the second separator are elements which are independent of the heat exchanger, which makes it possible to simplify manufacture and maintenance of the heat exchanger itself. Furthermore, this solution enables the same separators to be used with heat exchangers of different lengths depending on the thickness of the wall into which the unit is being built. Moreover, the total cross-sectional area of the first separator and the second separator preferably corresponds to the total cross sectional area of the heat exchanger, while the separators contain channels which are an extension of the air ducts of the heat exchanger, forming, together with the air ducts, a continuous volume, which is corrugated in shape and which enables the supply and extraction air flows to move freely, i.e. with the least resistance, from one separator to the heat exchanger, and then on to the other separator. According to the invention, the first separator and the second separator have external end holes facing away from the heat exchanger, every second external end hole being completely closed off, and internal distribution holes facing towards the axis of symmetry of the heat exchanger, every second internal distribution hole being completely closed off and being offset by one spacing of channels, relative to the external end holes. This particular design of separator determines the compactness and operational functionality of the separators, as a result of which the entire external end surface of the separator, directed away from the heat exchanger, is used for the passage of the supply and, respectively, extraction air flows, unlike the known prior art illustrated in FIG. 1, where the end surface is divided into an external zone 46 and an internal zone 47. In the proposed invention the entire end surface of the separator corresponds to the external zone 46 illustrated in FIG. 1, while the surface of the separator facing the axis of symmetry of the base, on which surface the internal distribution holes are located, corresponds to the internal zone 47 illustrated in FIG. 1. Preferably, the distribution holes of the separator are located along the axis of the cylindrical surface, perpendicular to the plane on which the external holes of the separator are located. This solution makes it possible to significantly reduce resistance to the supply and extraction air flows when compared to the known prior art.

According to one of the embodiments of the invention, the heat-exchange module comprises a base, in the form of a tubular element, with an axis of symmetry which is aligned with the axis of symmetry of the heat exchanger, and an external casing, which is also in the form of a tubular element, said external casing being concentrically located on the outside of the base, wherein the corrugated heat exchanger, in the form of a round ring cylinder, is located between the base and the external casing and acts as counter-flow recuperative heat exchanger. Preferably, the axis of at least one of the fans should be located parallel with and above the axis of symmetry of the heat exchanger, when the unit is in its mounted position in the external wall of a building. It has been determined, by means of experimentation, that this type of offsetting of the axis of a fan, relative to the axis of symmetry of a heat exchanger, reduces levels of condensate formation. This occurs by virtue of a change in the relationship between cross-sectional areas of air flows coming into the fan from the direction of the heat exchanger, in the upper part and the lower part of said air flows, as a consequence of which the dynamics of these air flows also changes, when compared to the scenario when the axis of the fan is located on the axis of symmetry of the heat exchanger. As a result of offsetting the axis of at least one of the fans relative to the axis of symmetry of the heat exchanger, the zone of high condensate formation is reduced in size when said fan draws in cold air. In the event that condensate still forms, the amount of condensate able to ingress into the fan (and consequently, into the building, in the case of an internal fan) reduces by virtue of the altered geometry of the fan housing, which is offset relative to the axis of symmetry of the heat exchanger.

The preferred design of separator channels is where said channels are located in the separator in such a way that they form a geometrical prolongation of the air ducts of the heat exchanger, along the entire length of the corresponding first separator and second separator. Positioning the channels of the separators in such a way, relative to the air ducts of the heat exchanger, makes it possible to additionally minimize resistance to the movement of the supply and extraction air flows.

When designing the cross section of the end holes of the separators to correspond to the cross section of the air ducts of the heat exchanger, the dynamic resistance of the supply and extraction air flows passing through the separators is additionally minimized when the condition of maximum compactness of the shape of the separators themselves is met.

According to another embodiment of the invention, the separators may be manufactured from a plastic material and have separator channels which have an aerodynamic profile designed to reduce resistance to the air flow passing through these channels, ensuring smooth inflow and outflow of air into (out of) the heat exchanger, which reduces the aerodynamic resistance of the unit overall and has a positive effect on reducing aerodynamic noise and consumed power. Separators manufactured of plastic significantly reduce condensate levels, reducing the risk of the unit icing up from the inside and the appearance of ice formations on the outside. Also, the material of the separators, in reducing condensate levels, minimizes the formation of ice on the surface of the heat exchanger, ensuring the efficiency of the heat exchanger and aerodynamic characteristics remain constantly high, thus improving the operating characteristics of the unit as a whole.

According to one of the embodiments of the invention, at least the first of the fans is installed in a housing which broadens out in a direction away from the corresponding separator, said housing having an inner tubular element adjoining an inner, i.e. located at the axis-of-symmetry end of the heat exchanger, edge of the external end holes of the corresponding separator, and an outer tubular element having a greater diameter than the inner tubular element. Moreover, the fan itself is located in the outer tubular element of the housing, while the position of the axis of symmetry of the outer tubular element of the housing of this fan is offset, parallel with the axis of symmetry of the inner tubular element of the housing of this fan. Moreover, the fan may be only partially located in the outer tubular element of the housing and may partially protrude from said outer tubular element of the housing, at the end lying opposite to the inner tubular element, correspondingly lying opposite the heat exchanger. The preferred location of the axis of symmetry of the outer tubular element of the housing of this fan is above the axis of symmetry of the inner tubular element of the housing of this fan when the unit is in its mounted position in the external wall of the building.

According to one of the embodiments of the invention, a tubular adaptor element is located between the outer and inner elements of the fan housing, said tubular adapter element preferably having a conical shape, tapering outwards in a direction away from the heat exchanger. This shape of fan housing is the most aerodynamic, and correspondingly, presents the least resistance to the air flow passing through this housing. The shape of the inner, outer and adapter elements of the fan housing may, in cross section, be round, oval or in the form of a polyhedron. Depending on the degree of offset of the axis of symmetry of the outer tubular element of the housing, relative to the axis of symmetry of the inner tubular element of this housing, the bottom line of intersection of the adapter element and the plane which runs through the axes of symmetry of the outer and inner tubular elements may be located either diverging in a direction away from the inner tubular element, towards the outer tubular element, relative to the axis of symmetry of the inner tubular element, or parallel with same, or converging in this direction. In the second and last abovementioned cases, when this line of intersection is located in the bottom part of the entire fan housing, when the unit is in its mounted position in the external wall of a building, the ingress of condensate, forming in the fan housing, into the outer tubular element of the fan housing, will be prevented, or be significantly reduced by virtue of the force of gravity acting on the condensate as it forms. In this embodiment of the invention, the axis of symmetry of the inner tubular element of the fan housing is in alignment with the axis of symmetry of the heat exchanger or is located parallel with same. In this embodiment of the invention, it is preferable to offset the axis of symmetry of the outer tubular element of the housing relative to the axis of symmetry of the inner element of the housing, for the first of the fans, i.e. the fan installed on the inside of the building, i.e. on the side of the internal premises. However, the design variant of this housing is also possible for a fan located outside a building, or for both fans.

According to another embodiment of the proposed invention, the axis of the first fan, located inside the wall of a building, is located in parallel with and above the axis of symmetry of the heat exchanger, when the unit is in its mounted position in the external wall of the building. This embodiment of the invention makes it possible to reduce the level of condensate formation in the section of the unit located closer to the inside of the wall of the building, relative to the heat exchanger. This solution results in the minimisation or elimination of condensate ingress into a ventilated building.

According to another embodiment of the invention, a breakout board chassis is fitted in the inner tubular element of the base of the heat-exchange module for the purpose of controlling operation of the unit, wherein the first separator and the second separator are fixed to the end surfaces of the chassis, while the chassis has a round baffle plate which transversely closes off the inner tubular element of the base. Said round baffle plate may be fixed either to one end surface of the chassis, or also to any section of the chassis between the end surfaces thereof. Alternatively, two round baffle plates, transversely closing off the inner tubular element of the base, can be fixed to the end surfaces of the chassis. Closing off the inner tubular element of the base is necessary in order to direct the supply and extraction air flows through the air ducts of the heat exchanger, correspondingly to prevent these flows from passing through the inner tubular element of the base. Such a chassis arrangement in the inner tubular element of the base allows the chassis to be used as a clamping device, to both ends of which the first separator and the second separator are fixed. If the length of the heat exchanger needs to be altered due to the thickness of the building wall into which the unit is being built, the total length of the base and the chassis is selected based on the required length of heat exchanger. Furthermore, the heat generated during operation of the chassis-mounted breakout board may be effectively used to heat the heat exchanger. All the connections on the boards (not shown) are provided with the aid of plug-and-socket connectors, without using bulky terminal blocks and unwieldy cable runs, which improves connection reliability and saves internal space for the unimpeded passage of air.

At low outside temperatures, a heating element can be used for additional heating of the air, said heating element being fitted between the heat exchanger and the outer casing of the heat-exchange module.

According to one of the embodiments of the invention, an indoor module comprises a housing which has a front and side surfaces, as well as at least one flapper valve for closing off the supply and/or extraction air flows, said flapper valve being located on at least one side surface of the housing. When the unit is not being used, this at least one flapper valve hydraulically separates the indoor space of the building from the internal space of the unit.

As an option, the indoor module may comprise an electronic display to allow for visual control of the unit's operation, wherein the electronic display is fitted to the front surface of the housing of the indoor module, which provides an ergonomic way to control the operation and monitor the parameters of the unit during operation.

According to another embodiment of the invention, the indoor module comprises an angled baffle plate for altering the direction and separation of the supply and extraction air flows, directing these flows in opposite directions inside the building, said angled baffle plate being located inside the housing of the indoor module.

It is preferable, in at least one channel formed by the angled baffle plate, to fit an air filter, in order to prevent contaminants, suspended in the air flow, from ingressing into and/or egressing the building.

In order to reduce indoor noise generated by the unit during operation, the indoor module comprises a polymer noise attenuator fitted in the housing thereof. The preferred design of polymer noise attenuator has a cross section corresponding to the cross section of the front surface of the indoor module, but not less than 70%, preferably not less than 90% of the area of said front surface. As an option, the polymer noise attenuator may be used as a filter for the air flows.

According to another embodiment of the invention, an anti-icing heating element, designed to provide protection against icing up of potential condensate, is fitted to the bottom part of the unit, the part which adjoins the outside wall of the building.

According to another embodiment of the invention, the unit is additionally equipped with an external outdoor module, located on the outside of a wall of a building, said outdoor module having an angled front surface, the bottom edge of which stands out further from the external wall of the building than the upper edge, and sides which have holes for supply and extraction air flows. The angled design of the external side of the wall of the outdoor module prevents the ingress of external precipitation into the unit. The preferred location of the holes for supply and extraction air flows is on the opposing side surfaces of the outdoor module.

BRIEF DESCRIPTION OF DRAWINGS

The attached drawings clearly illustrate the proposed invention, based on embodiments of same, showing.

DETAILED DISCLOSURE OF THE INVENTION

The concept of the claimed invention will be disclosed subsequently in more detail, using specific examples of embodiments thereof. This concept, however, may also be implemented in other embodiments of the invention which include only features included in the claims, and which embodiments are not limited by the cited examples. Numbering of reference designations is consistently maintained for all embodiments of the invention.

Figure 1:
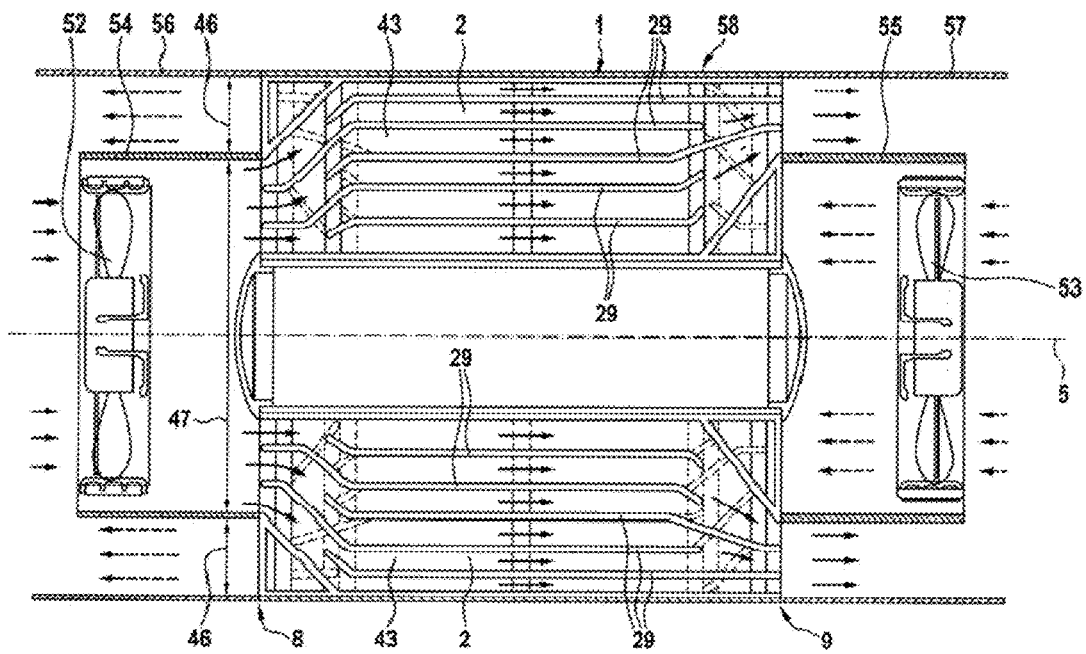
FIG. 1 shows the heat-exchange device according to the prior art.

As already indicated above, FIG. 1 illustrates the vertical cross section through the heat-exchange device known from the prior art, in which device the axes of both fans, located on each side of the heat exchanger, are aligned with the axis of symmetry of the heat exchanger.

Figure 2:
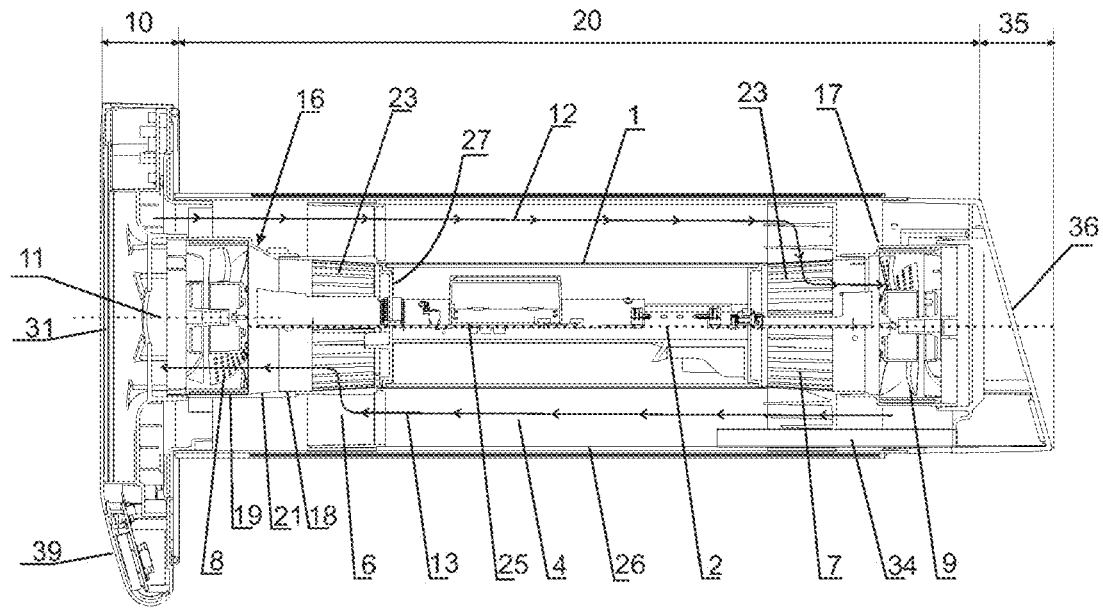
FIG. 2 shows a vertical cross section of one of the embodiments of the invention.
Figure 5:
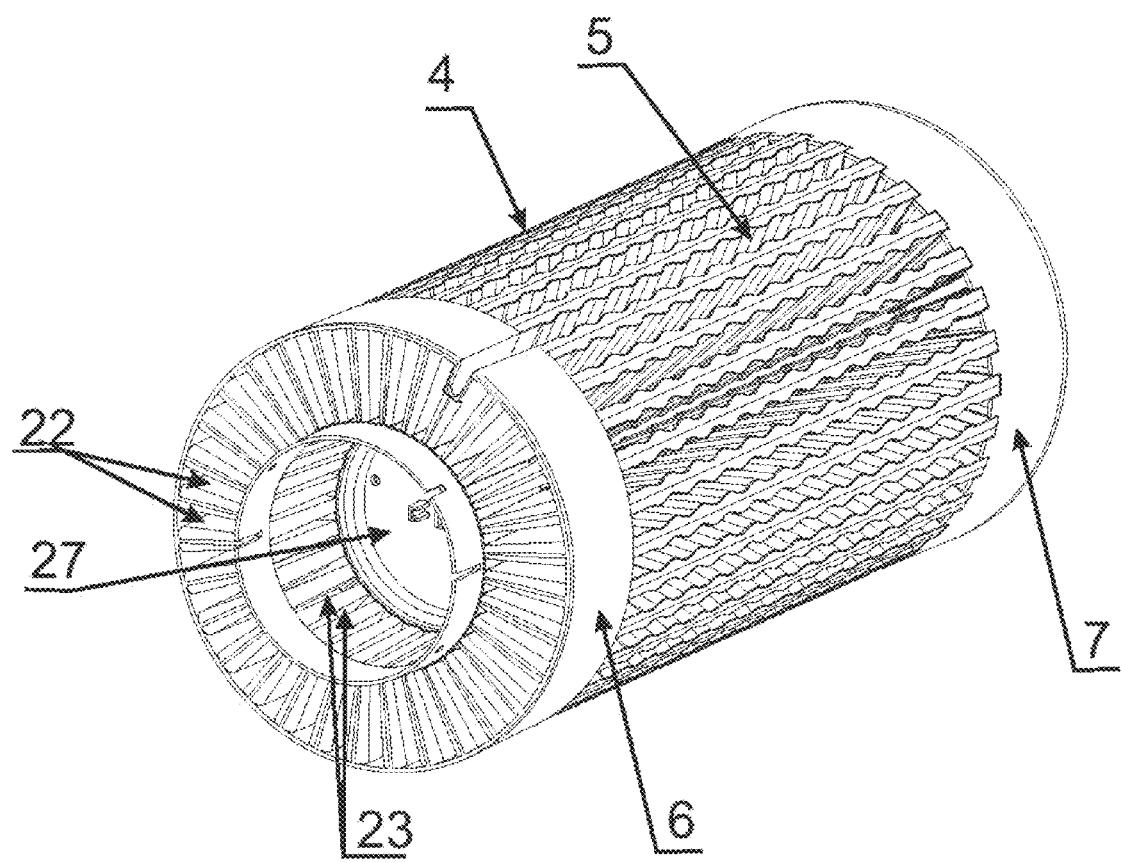
FIG. 5 shows a perspective view of the heat exchanger with a first separator and a second separator.
Figure 6:
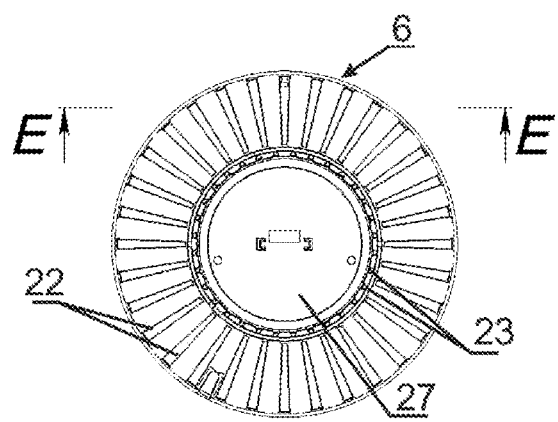
FIG. 6 shows an end view, looking at the first separator and the heat exchanger adjoining same.
Figure 7:
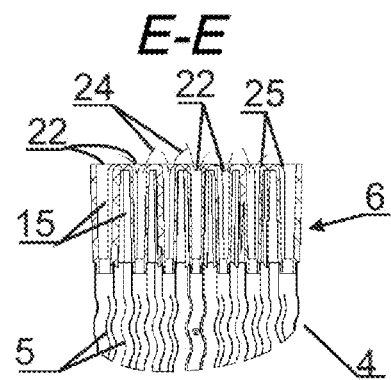
FIG. 7 shows a cross section E-E according to FIG. 6.
Figure 8:
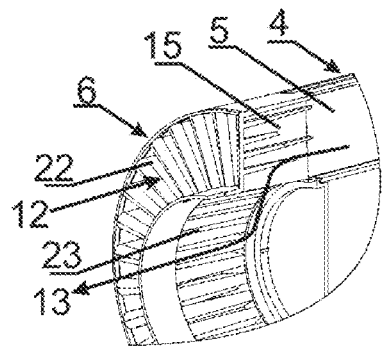
FIG. 8 shows a partial illustration of the vertical cross section shown in FIG. 6, with the first separator and part of the heat exchanger.

FIG. 2 illustrates the vertical cross section of one of the embodiments of the claimed invention. The claimed decentralized supply and extract unit with waste heat recovery incorporates a base 1 in the form of a tubular element, an external casing 3, in the form of a tubular element, concentrically located on the outside of the base 1, as well as a corrugated heat exchanger 4 with an axis of symmetry 2, said corrugated heat exchanger being located between the base 1 and the external casing 3. The axes of symmetry of the base 1 and the external casing 3 are preferably in alignment with the axis of symmetry 2 of the heat exchanger 4. An embodiment of the heat exchanger 4, with first and second separators 6, 7 adjoining the end surfaces of same, is illustrated in perspective in FIG. 5. Heat exchanger 4 has a plurality of heat-exchange air ducts 5, located along the axis of symmetry 2 of the heat exchanger, said air ducts being cross-sectionally similar and being located adjacent to each other, forming a continuous corrugated volume of heat-exchange segments. The heat exchanger 4 is in the form of a round ring cylinder, the length of which corresponds to the length of the base 1. The shape of the air ducts 5 of the heat exchanger 4, may be either straight or wavy along the length of said air ducts as shown in FIG. 5, which makes it possible to convert the dynamic air flow in the air ducts 5 from a laminar flow into a turbulent flow, at the same time improving the transfer of thermal energy by mixing air in the compartments of the heat exchanger, which in turn leads to an increase in heat-exchange efficiency between the supply and extraction air flows, 12, 13. A first separator and a second separator 6, 7 are located along both end surfaces of the heat exchanger 4, the purpose of said separators being to separate and direct extraction and supply air flows 12, 13 in opposite directions in adjoining heat-exchange air ducts 5. The first separator and the second separator 6, 7 are preferably in the form of a round ring cylinder, the cross-sectional area of which corresponds to the cross-sectional area of the heat exchanger 4. Each of the separators 6, 7 contains channels 15, illustrated in FIG. 8, said channels being an extension of the air ducts 5 of the heat exchanger 4, forming, together with the air ducts 5, a continuous volume of corrugated shape. Each of the first and second separators 6, 7 has external end holes 22, facing away from the heat exchanger 4, every second end hole being completely closed off, as illustrated in FIG. 6-FIG. 8. In addition, each of the first and second separators 6, 7 comprises internal distribution holes 23, directed towards the axis of symmetry 2 of the heat exchanger, every second distribution hole being completely closed off and being offset by one spacing of channels of the separator 15, relative to the external end holes 22. Preferably, the internal distribution holes 23 of the separators 6, 7 are located on the inner surface of each of the separators 6, 7 which are in the form of a round ring cylinder, as is shown in FIG. 8. Therefore, each of the channels of the separator 15, in the case of channels which are adjacent to each other, has, alternately, an external end hole 22 and an internal distribution hole 23, in a direction around the axis of symmetry of each of the separators 6, 7. The axis of symmetry of each of the separators 6, 7 preferably coincides with the axis of symmetry 2 of the heat exchanger.

Figure 9:
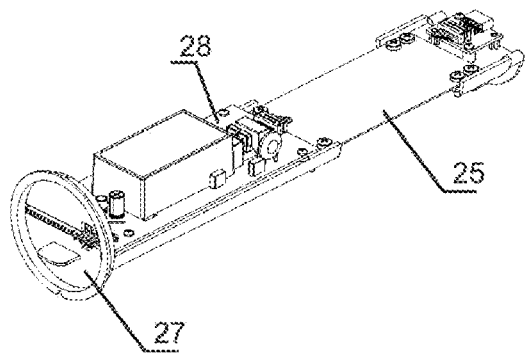
FIG. 9 shows a perspective view of the chassis with breakout board.

Furthermore, as illustrated in FIG. 1, breakout-board chassis 25, illustrated separately in FIG. 9, is located in the base 1. A breakout board 28, with an electronics module, is located on breakout-board chassis 25, and in addition, a round baffle plate 27 is located on one of the end sections of the chassis 25. The length of the chassis 25 corresponds to the length of the base 1 and can vary depending on the thickness of the wall into which the device is built, together with the length of the base 1 and the length of the heat exchanger 4. The size of the baffle plate 27 corresponds to the internal diameter of the base 1 and closes off the base 1 completely, at the end surface thereof, preventing air flows from passing through the internal area of the base 1. The chassis 25 acts as a clamping device for the separators 6, 7, which are fixed to the opposing end surfaces of the chassis 25 and are installed on base 1. Alternatively, each of the separators 6 and 7 may be fixed to the base 1 and/or to the external casing 3, rather than to the opposing end surfaces of the chassis 25. Alternatively, the breakout board 28, together with the chassis thereof, may be fitted in any other location of the device, for instance in the indoor module 10.

Figure 3:
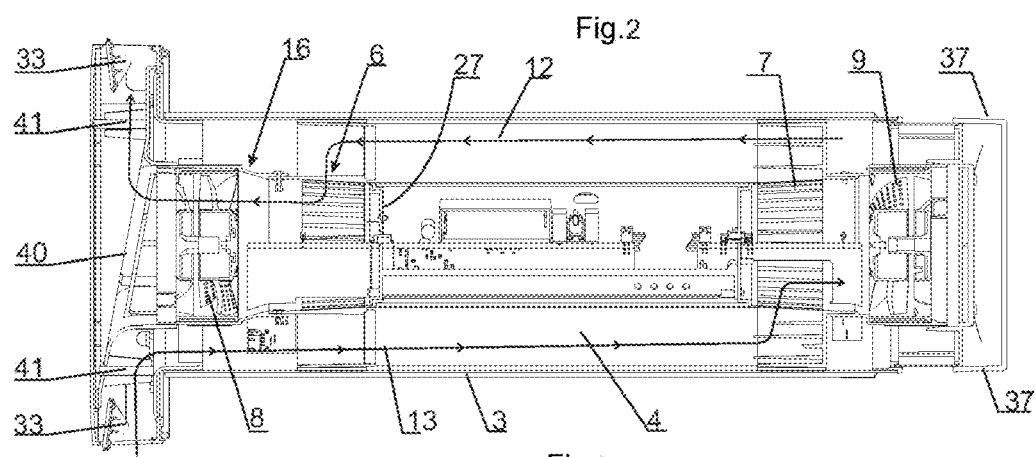
FIG. 3 shows a horizontal cross section of the embodiment of the invention illustrated in FIG. 2.
Figure 4:
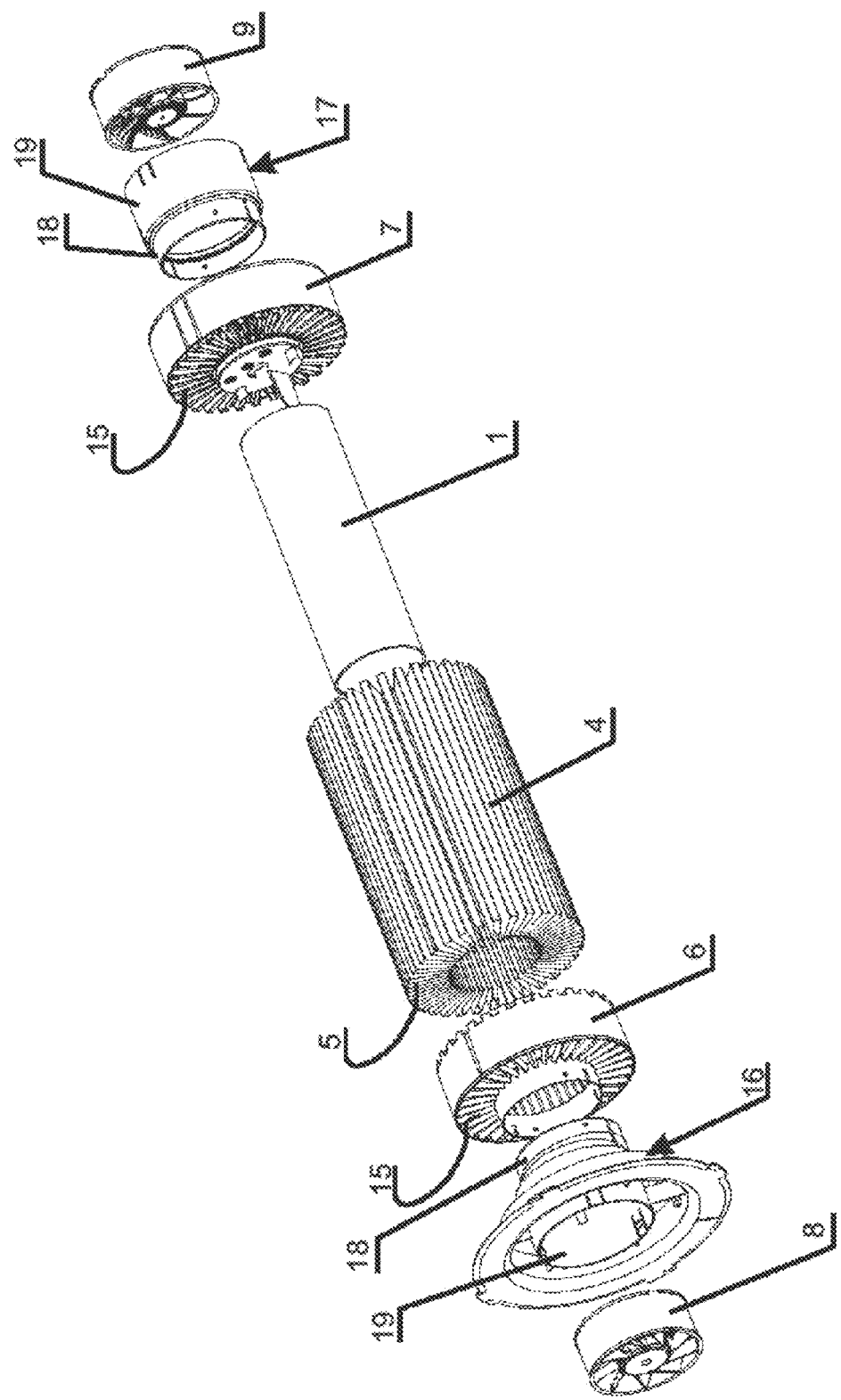
FIG. 4 shows an exploded perspective view of the main elements of the claimed unit.

As shown in FIG. 2 and FIG. 3, which illustrate a horizontal cross section through the ventilation unit, the unit comprises a first fan and a second fan 8, 9, the housings 16, 17 of which adjoin the first separator and the second separator 6, 7, at the ends of the separators directed away from the heat exchanger 4. In the embodiment of the invention illustrated in FIG. 2 and FIG. 3, each of the fans 8 and 9 is fitted in a housing 16, 17 which broadens out in a direction away from the corresponding separator 6, 7, said housing having an inner tubular element 18, which adjoins the inner edge, i.e. the edge located at the axis-of-symmetry 2 end of the heat exchanger, of the external end holes 22 of the corresponding separator 6, 7, and having an outer tubular element 19 which has a greater diameter than the inner tubular element 18. A tubular adaptor element 21, which in this embodiment is conical in shape, is located between the inner tubular element 18 and the outer tubular element 19. Here it is worth noting that the housings 16, 17 of the fans may not necessarily have a tubular adaptor element, as illustrated in the case of the housing 17 of the second, i.e. outer, fan 9 in FIG. 4, which illustrates an exploded view of the main elements of the unit. In the embodiment of the invention illustrated in FIG. 2 and FIG. 3, the housing 16 of the first, i.e. the inner fan 6, is manufactured in such a way that the first fan 8 itself is located in the outer tubular element 19, while the axis of symmetry of the outer tubular element 19 is located above the axis of symmetry of the inner tubular element 18, when the unit is in its mounted position in the external wall of a building. In this embodiment of the invention, the bottom line of intersection of the tubular adaptor element 21 and the plane which runs through the axes of symmetry of the outer and inner tubular elements 19, 18, is positioned at a gentler incline i.e. having a lesser angle to the horizontal, than the upper line of intersection of this tubular adaptor element 21 in this same plane. This makes it possible to prevent, or to significantly reduce, the ingress of condensate, forming in the housing of this fan, into the outer tubular element of the housing of the fan 19, and consequently, into a ventilated room, when the supply air flow 13 moves from the outside to the inside via the first fan 8. In the embodiment of the invention illustrated in FIG. 2, only the first of the fans 8 has a housing 16, the axis of symmetry 11 of the outer tubular element 19 of which housing does not coincide with the axis of symmetry 2 of the heat exchanger, in this case the axis of symmetry of the housing 16 being located above the axis of symmetry 2 of the heat exchanger. A similar design is also possible for the second fan 9 alone, or for both fans 8 and 9.

FIG. 6 illustrates the end view, looking onto the first separator 6 and the part of the heat exchanger 4 adjoining said first separator. The shape of the first separator 6 is particularly clearly illustrated here, as a round ring cylinder which has in effect exactly the same cross section as the cross section of the heat exchanger 4. The external end holes 22 of the first separator 6 are located effectively at an angle of 90 degrees relative to the internal distribution holes 23 of the first separator 6, so that the plane in which each of the internal distribution holes 23 is located proves to be parallel with the axis of symmetry 2 of the heat exchanger 4.

FIG. 7 illustrates the cross section E-E, according to FIG. 6, from which it can be seen that the cross section of the end holes 22 corresponds to the cross section of the air ducts 5 of the heat exchanger 4, while the channels 15 of the separator 6 are a geometrical extension of the air ducts 5 of the heat exchanger 4.

FIG. 8 depicts a partial illustration of the vertical cross section shown in FIG. 6, with the first separator 6 and part of the heat exchanger 4, said partial illustration providing clarification of the illustrations in FIG. 6 and FIG. 7. Arrows 12 and 13 denote the extraction and supply air flows respectively. The design of the second separator 7 is identical to the design of the first separator 6, the only difference being that the installed position of the second separator 7 is turned around by 180° relative to the first separator 6.

Figure 10:
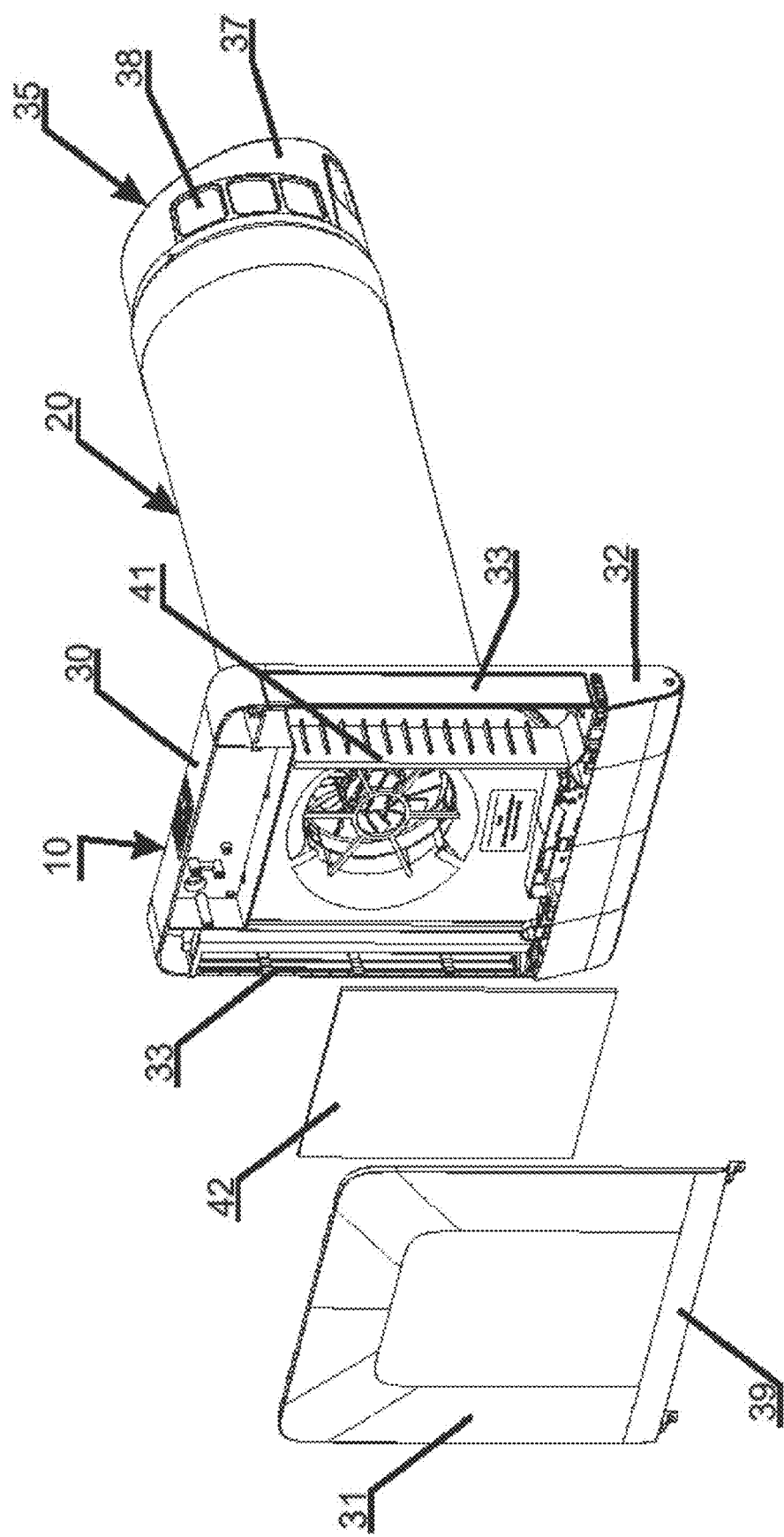
FIG. 10 shows a perspective view of one of the embodiments of the claimed invention with elements of the body of the indoor module partially exploded.

FIG. 10 shows a perspective view of one of the embodiments of the claimed invention, with partially exploded elements of the housing of the indoor module 10, which adjoins the heat-exchange module 20. An external outdoor module 35 adjoins the reverse side of the heat-exchange module 20, said external outdoor module having sides 37 with holes 38 for supply and extraction air flows. The indoor module 10 comprises a housing 30 which has a front 31 and side 32 surfaces, as well as flapper valves 33, located on both side surfaces 32 of the housing of the indoor module, the purpose of said flapper valves being to close off the supply and/or extraction air flows 12, 13. The indoor module contains an angled baffle plate 40, illustrated in FIG. 3, for separating the supply and extraction air flows 12, 13. An air filter 41, illustrated in FIG. 3 and FIG. 10, is fitted in the channels formed by the angled baffle plate 40 for the supply and extraction air flows.

According to one of the embodiments of the invention, the indoor module 10 comprises a polymer noise attenuator 42 fitted in the housing 30 of the indoor module, said noise attenuator facilitating a reduction in the operating noise of the unit. An electronic display 39, for controlling and monitoring operation of the claimed device, is located on the front surface 31 of the housing of the indoor module 10.

According to another embodiment of the invention, the unit is additionally equipped with an external outdoor module 35, located on the outside of the wall of a building, said module being illustrated in FIG. 2, FIG. 3 and FIG. 10 and having an angled front surface 36, the bottom edge of which stands out further from the external wall of the building than the upper edge of same, as well as sides 37, having holes 38 for supply and extraction air flows.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A decentralized supply and extract unit, with waste heat recovery, designed to be mounted into an external wall of a building, said decentralized supply and extract unit having an indoor module and, adjoining thereto, a heat-exchange module, comprising:
   a cylindrical heat exchanger with a plurality of heat-exchange air ducts, located along an axis of symmetry of the cylindrical heat exchanger, said air ducts adjoining each other, forming a continuous corrugated volume of heat-exchange segments,
   a first separator and a second separator for separating and directing extraction and supply air flows in opposite directions in the heat-exchange air ducts, wherein the first separator and the second separator adjoin the cylindrical heat exchanger, at both end surfaces thereof, and are installed on the axis of symmetry of same,
   a first fan and a second fan each comprising a housing, each of which adjoins the first separator and the second separator respectively, at ends of the separators facing away from the cylindrical heat exchanger, and wherein an axis of one of the fans is located parallel but not aligned with an axis of the other fan,
   wherein the cylindrical heat exchanger is corrugated;
   wherein the first separator and the second separator are
      separate elements from the cylindrical heat exchanger,
   have a total cross section which corresponds to a total cross section of the cylindrical heat exchanger,
   contain channels, which are an extension of the air ducts of the cylindrical heat exchanger, forming, together with the air ducts, a continuous volume also corrugated in shape,
   have external end holes, facing away from the cylindrical heat exchanger, every second external hole being closed off completely, and
   internal distribution holes, facing towards the axis of symmetry of the cylindrical heat exchanger, every second hole of the external end holes being closed off completely and being offset by one of the channels of a respective separator, relative to the external end holes.

2. The decentralized supply and extract unit according to claim 1, wherein the heat-exchange module comprises a base, in the form of a tubular element, with an axis of symmetry which is aligned with the axis of symmetry of the cylindrical heat exchanger, an external casing, comprising a tubular element, concentrically located on an exterior of the base, wherein, the cylindrical heat exchanger comprises a round ring cylinder located between the base and the external casing, and wherein, the axis of at least one of the fans is located parallel but not aligned with the axis of symmetry of the cylindrical heat exchanger.

3. The decentralized supply and extract unit according to claim 1, wherein the channels running along an entire length of the respective separator are a geometrical extension of the air ducts of the cylindrical heat exchanger.

4. The decentralized supply and extract unit according to claim 1, wherein a cross section of the end holes of the separators corresponds to a cross section of the air ducts of the cylindrical heat exchanger.

5. The decentralized supply and extract unit according to claim 1, further comprising at least the first of the fans installed in the housing which broadens out in a direction away from the respective separator, the housing comprises:

an inner tubular element, adjoining an inner edge of the external end holes of the respective separator, and an outer tubular element comprises a diameter greater than a diameter of the inner tubular element, wherein, the at least the first of the fans is located in the outer tubular element of the housing, while an axis of symmetry of the outer tubular element of the housing of the at least the first of the fans is located to be not in alignment with an of symmetry of the inner tubular element of the housing of the at least the first of the fans.

6. The decentralized supply and extract unit according to claim 5, wherein the axis of symmetry of the outer tubular element of the housing of at least the first of the fans is located above the axis of symmetry of the inner tubular element of the housing of the at least the first of the fans.

7. The decentralized supply and extract unit according to claim 5, wherein the housing of the at least the first of the fans has a tubular adaptor element located between the inner and the outer tubular elements.

8. The decentralized supply and extract unit according to claim 1, wherein the axis of the first fan, positioned on an inside wall of the building, is locatable parallel and above the axis of symmetry of the cylindrical heat exchanger.

9. The decentralized supply and extract unit according to one claim 1, further comprising a chassis, with a breakout board, that is fitted in an inner tubular element of a base of the heat-exchange module for the purpose of controlling operation of the unit, wherein the first separator and the second separator are each fixed to one of the end surfaces of the chassis, while the chassis has a round baffle plate, which transversely closes off the inner tubular element of the base.

10. The decentralized supply and extract unit according to claim 1, further comprising a heating element that is installed between the cylindrical heat exchanger and an external casing of the heat-exchange module, for the purpose of providing additional heating of the air at low outdoor temperatures.

11. The decentralized supply and extract unit according to claim 1, further comprising the indoor module, locatable on an inside of a building wall, comprises a housing which has a front surface and side surfaces, as well as at least one flapper valve located on at least one side surface of the housing, for the purpose of closing off the supply and/or extraction air flows.

12. The decentralized supply and extract unit according to claim 11, wherein the indoor module comprises an angled baffle plate, for altering the direction and separation of supply and extraction air flows, wherein the angled baffle plate is located inside the housing of said indoor module.

13. The decentralized supply and extract unit according to claim 12, further comprising an air filter that is fitted in at least one channel formed by the angled baffle plate.

14. The decentralized supply and extract unit according to claim 11, wherein the indoor module comprises a polymer noise attenuator fitted in the housing of the indoor module.

15. The decentralized supply and extract unit according to claim 5, wherein the housing of at least the first of the fans has a conical in shape located between the inner and the outer tubular elements.

16. The decentralized supply and extract unit according to claim 5, wherein the inner edge is an edge located at the axis-of-symmetry end of the cylindrical heat exchanger.

* * * * *